(12) United States Patent
Fajardo

(10) Patent No.: US 7,708,287 B2
(45) Date of Patent: May 4, 2010

(54) STAGGERED PRESSURE ZONE COLLET ASSEMBLY

(75) Inventor: Iggoni Sunga Fajardo, Sunol, CA (US)

(73) Assignee: Fourte Design & Development LLC, Sunol, CA (US)

( * ) Notice: Subject to any disclaimer, the term of this patent is extended or adjusted under 35 U.S.C. 154(b) by 803 days.

(21) Appl. No.: 11/409,581

(22) Filed: Apr. 24, 2006

(65) Prior Publication Data

US 2010/0078898 A1 Apr. 1, 2010

(51) Int. Cl.
*B23B 31/40* (2006.01)
(52) U.S. Cl. .................... 279/2.03; 279/2.12; 279/137; 269/48.1; 720/707
(58) Field of Classification Search .............. 279/2.02, 279/2.03, 2.04, 2.12, 46.8, 50, 53, 43.4, 46.3, 279/137; 269/48.1; 242/572, 573, 573.1, 242/573.8, 573.9; 720/706–714; 369/270.1, 369/261; 360/99.12, 99.08, 99.04, 99.05; 82/169; *B23B 31/40*
See application file for complete search history.

(56) References Cited

U.S. PATENT DOCUMENTS

| | | | | |
|---|---|---|---|---|
| 2,644,929 A | * | 7/1953 | Kumpf | .................. 333/263 |
| 2,928,680 A | * | 3/1960 | Sattler | ................... 279/2.03 |
| 2,935,329 A | * | 5/1960 | Hessler | ..................... 279/51 |
| 3,311,383 A | * | 3/1967 | Cox | ..................... 279/2.03 |
| 3,968,972 A | * | 7/1976 | Morgan | ................. 279/2.03 |
| 4,208,061 A | | 6/1980 | Morawski | |
| 4,497,498 A | * | 2/1985 | Buck | ..................... 279/2.03 |
| 4,705,279 A | | 11/1987 | Mizukami et al. | |
| 5,275,424 A | * | 1/1994 | Watanabe | .............. 279/2.03 |
| 5,715,114 A | * | 2/1998 | Gotou | ................ 360/98.08 |
| 5,785,324 A | | 7/1998 | Williams et al. | |
| 6,145,849 A | | 11/2000 | Bae et al. | |

* cited by examiner

*Primary Examiner*—Eric A Gates
(74) *Attorney, Agent, or Firm*—Carr & Ferrell LLP

(57) ABSTRACT

A collet assembly that holds two disks to be processed simultaneously uses alternating pressure zones to press against the inner diameter of the disks to hold them in place in a processing machine. While the disks to be processed are typically media disks, any type of disk processing can make use of the collet assembly of the present invention. Each pressure zone includes a contact surface on a chuck blade. When a travel stroke is initiated by an actuating device (typically an air cylinder), the drawbar pulls an angled expander rearward. The expander urges the chuck blades outward. Half of the pressure zones apply pressure (via the contact surfaces on the chuck blades) to the first disk, while the other half of the contact surfaces press against the second disk, so that both disks are held securely in position. The pressure zones that apply pressure to the first disk are interspersed with the pressure zones that apply pressure to the second disk, so that the pressure zones alternate around the circumference of the collet.

12 Claims, 4 Drawing Sheets

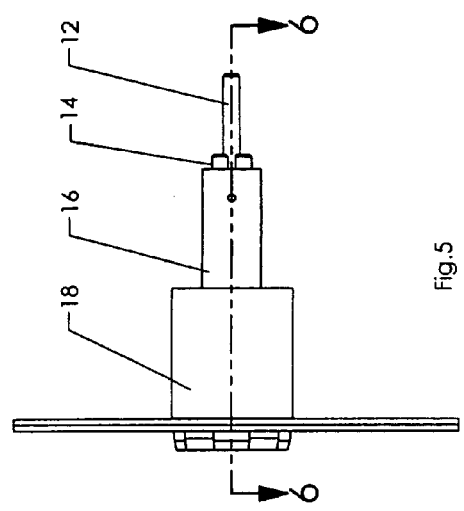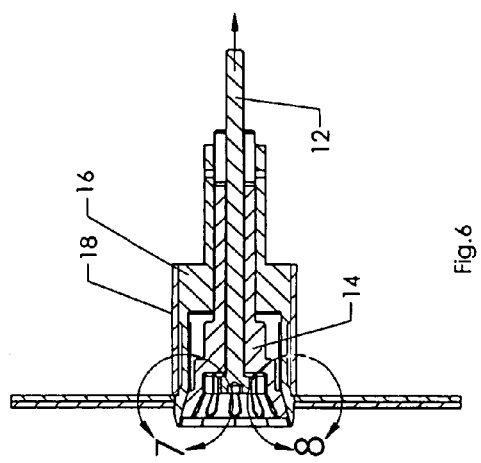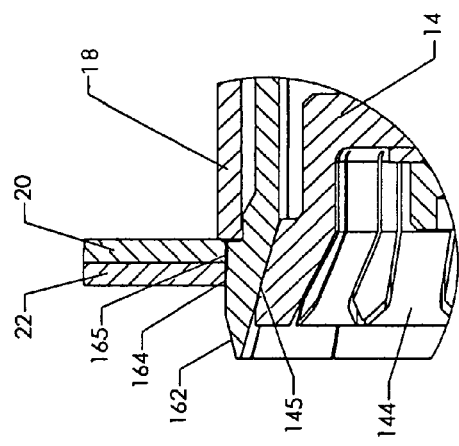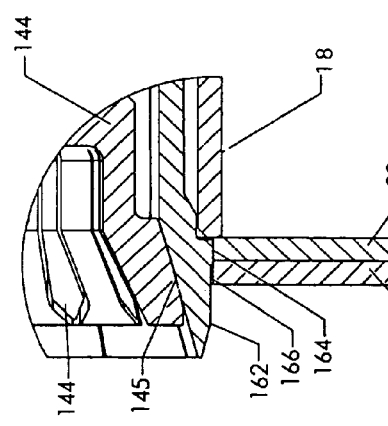

STAGGERED PRESSURE ZONE COLLET ASSEMBLY

BACKGROUND OF THE INVENTION

1. Field of the Invention

The present invention relates generally to memory media processing equipment, and more particularly is a collet assembly used on a mounting chuck on a processing tool.

2. Description of the Prior Art

The incredible progression in storage density of disk media in the recent past is well documented. The amount of data that can be stored on a disk has increased exponentially. As storage density in disk technology improves, the real estate required on the disk for storage of a given amount of data has decreased proportionally. The art has advanced to the stage that many applications do not require that both sides of a disk be used. Only a single side of the disk is used to store information.

The equipment used to manufacture disks has historically been adapted to enable the processing of both sides of a disk, often simultaneously. This equipment is quite expensive. Therefore, it is quite advantageous to be able to use existing equipment designed for double sided processing for the single side disk manufacturing process. To do so requires the use of a mounting chuck that is capable of receiving two disks at once.

Accordingly, it is an object of the present invention to provide a collet for a mounting chuck that receives two disks simultaneously.

It is another object of the present invention to provide a collet that holds the disks in place by applying pressure to an inner diameter of the disk, so that the data storage area is not compromised.

A further object of the present invention is to provide a collet that applies force to multiple pressure zones to accommodate any imperfections in the center hole of the disk.

SUMMARY OF THE INVENTION

The present invention is a collet assembly that holds two disks to be processed simultaneously. While the disks to be processed are typically media disks, any type of disk processing can make use of the collet assembly of the present invention. The collet comprises multiple staggered pressure zones (ten in the preferred embodiment). Each pressure zone includes a contact surface on a chuck blade. When a travel stroke is initiated by an actuating device (typically an air cylinder), the drawbar pulls an angled expander rearward. The expander urges the chuck blades outward. Half of the pressure zones apply pressure (via the contact surfaces on the chuck blades) to the first disk, while the other half of the contact surfaces press against the second disk, so that both disks are held securely in position. The pressure zones that apply pressure to the first disk are interspersed with the pressure zones that apply pressure to the second disk, so that the pressure zones alternate around the circumference of the collet.

The assembly can be used on single disk operations, and can also accommodate disks of varying thicknesses.

An advantage of the present invention is that it firmly holds two single sided disks in processing position.

Another advantage of the present invention is that the multiple pressure zones allow for firm contact with the inner diameter of each disk in spite of any imperfections that may be present in the center holes of the disks.

These and other objects and advantages of the present invention will become apparent to those skilled in the art in view of the description of the best presently known mode of carrying out the invention as described herein and as illustrated in the drawings.

BRIEF DESCRIPTION OF THE DRAWINGS

FIG. 5 is a side view of the collet with two disks mounted thereon.

FIG. 6 is a sectional view taken along line 6-6 in FIG. 5.

FIG. 7 is a detail view of the circled area labeled 7 in FIG. 6

FIG. 8 is a detail view of the circled area labeled 8 in FIG. 6

DETAILED DESCRIPTION OF THE INVENTION

Figure 1:
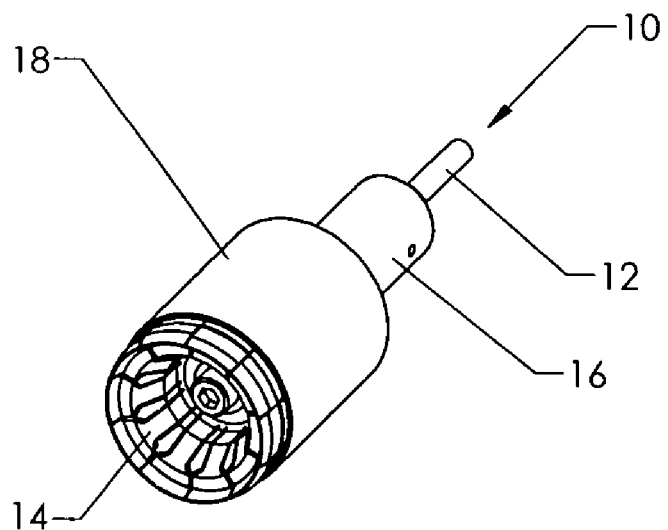
FIG. 1 is a perspective view of the staggered pressure zone collet of the present invention.
Figure 2:
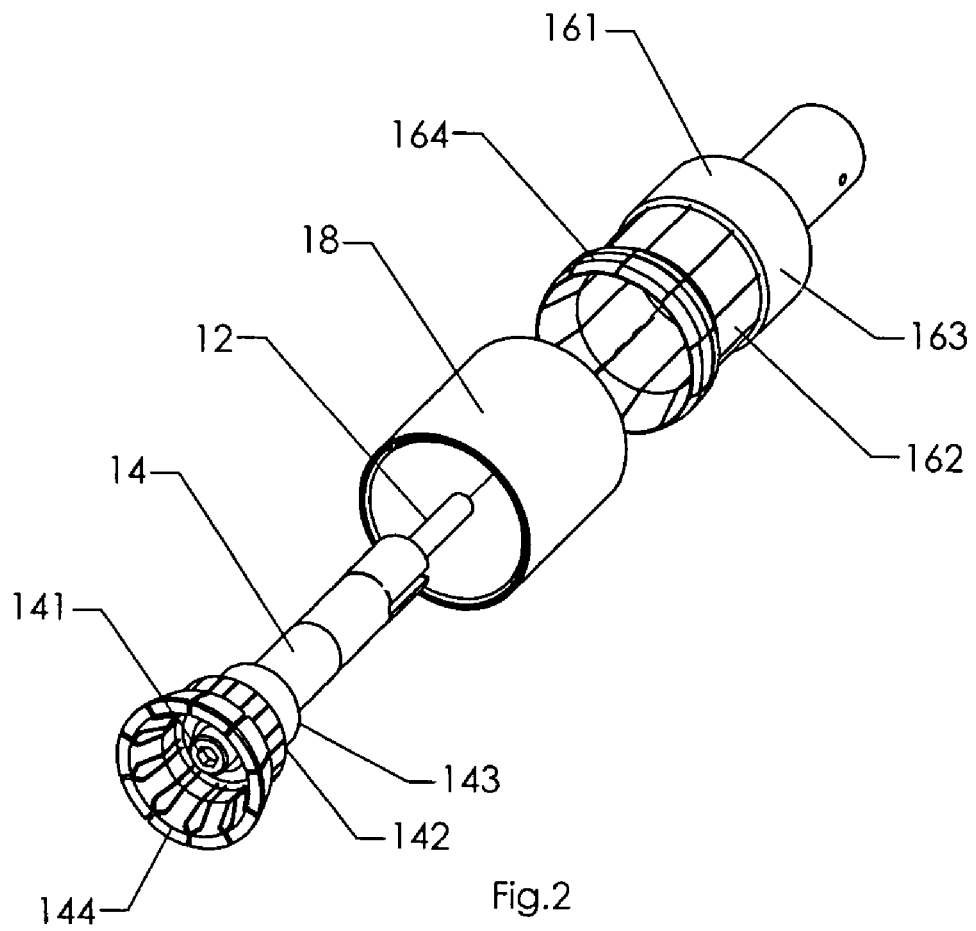
FIG. 2 is an exploded view of the collet illustrated in FIG. 1.
Figure 3:
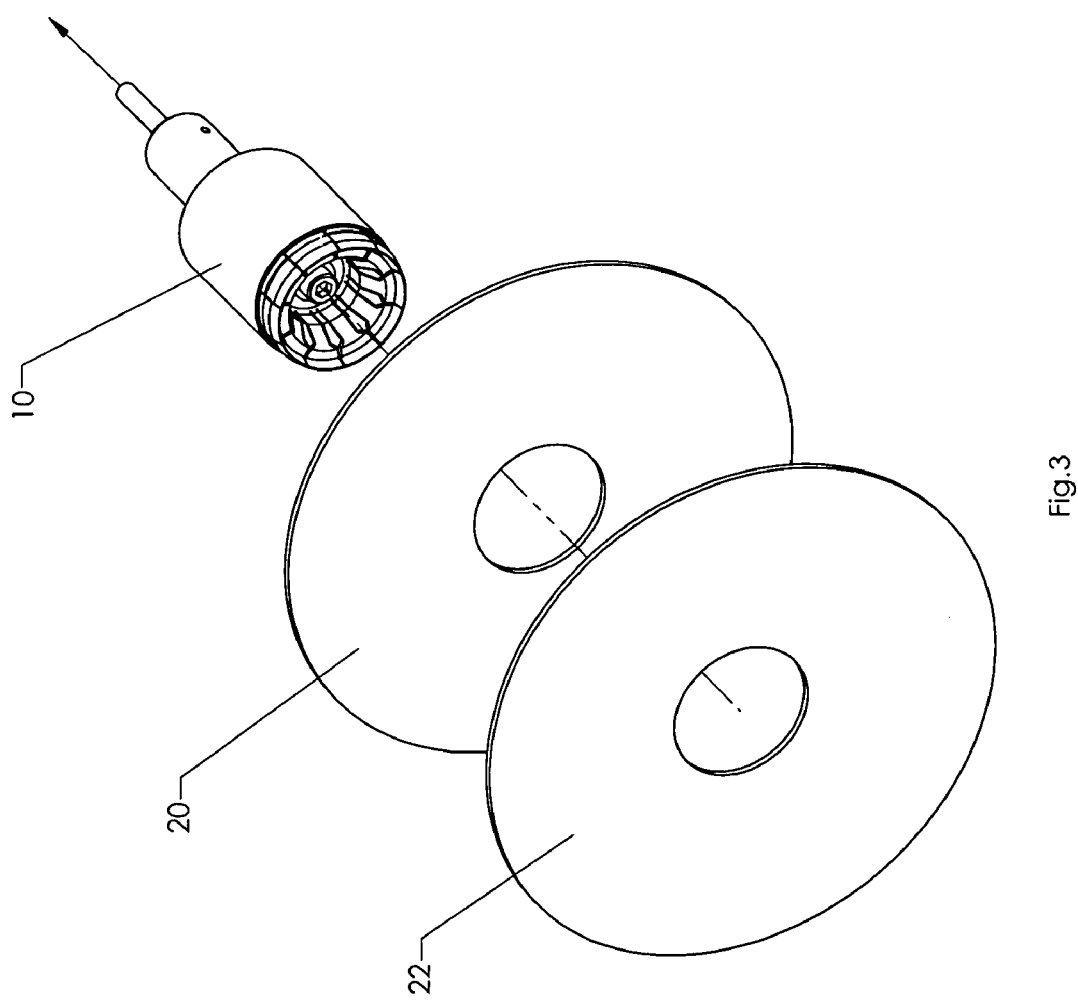
FIG. 3 shows two disks approaching the collet.
Figure 4:
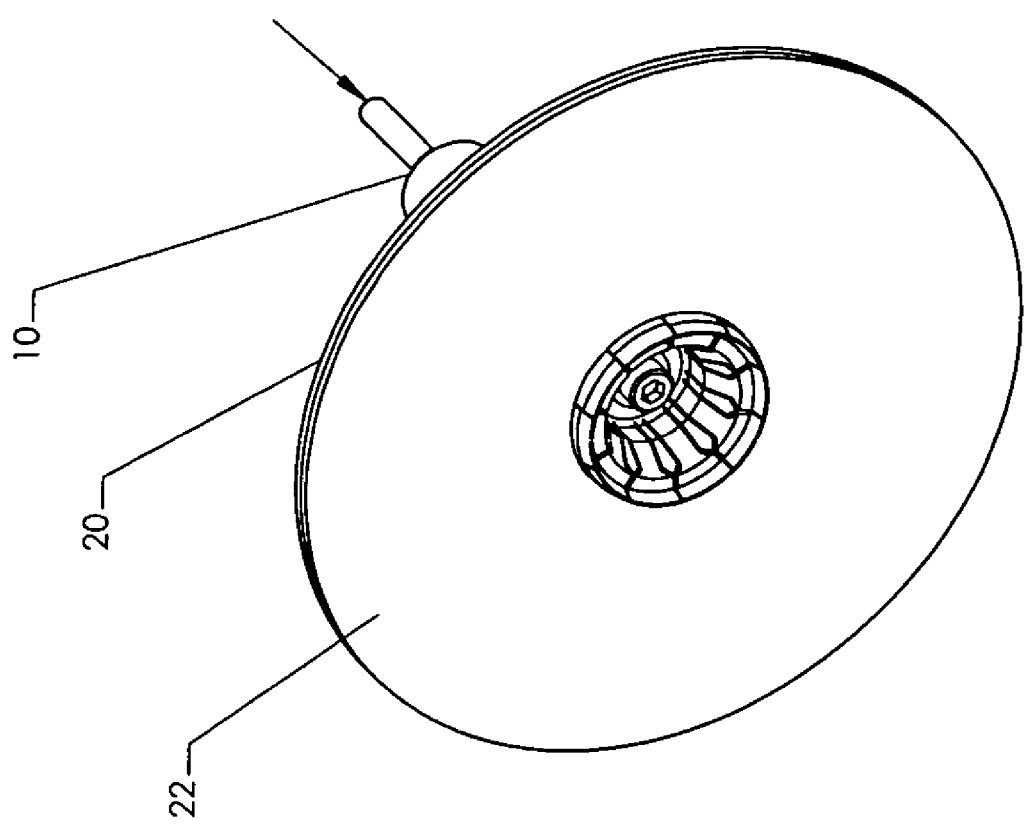
FIG. 4 shows the disks in position on the collet.

The present invention is a multiple pressure zone collet assembly 10. The collet assembly 10 comprises a drawbar 12, a segmented expander 14, a segmented mounting chuck 16, and a compression sleeve 18. The drawbar 12 is driven by an actuation means (not shown). The actuation means is typically an air cylinder. The collet assembly 10 is used to secure in position a pair of disks, a rearward disk 20 and a forward disk 22. It should be noted that while standard processes will typically operate on two disks simultaneously, a single disk can of course be processed.

The expander 14 comprises chiefly a frustum shaped expander head 141 and a head base 142. The head base 142 is affixed to and moves with the drawbar 12. The head base 142 includes a shoulder 143 that limits the travel path of the expander 14 by contacting a shoulder 161 of the mounting chuck 16 so that the expander 14 cannot be withdrawn rearward through the mounting chuck 16.

A plurality of expander blades 144 extend outward from the head base 142. The distal ends of the expander blades 144 are unattached, so that the blades 144 can flex. Each of the distal ends of the expander blades 144 comprises a chuck blade contact surface 145 with an angled outer surface.

The segmented mounting chuck 16 comprises a plurality of chuck blades 162 extending outward from a chuck base 163. As with the expander blades 144, the chuck blades 162 are fixed at a lower end in the base 163, but are not affixed at their distal ends so that they can flex. This allows the chuck blades 162 to expand outward when urged by an expanding force. The number of the chuck blades 162 corresponds to the number of the expander blades 144. In the preferred embodiment of the present invention, the number of chuck blades 162 and expander blades 144 is ten.

Each of the distal ends of the chuck blades 162 comprises a disk inner diameter contact surface 164. The contact surface 164 is the surface that actually contacts the inner diameter of the disk to be held in place. As is best seen in FIGS. 7 and 8, the contact surfaces 164 of the chuck blades 162 have an angled inner surface that conforms to the angle of the outer surfaces of the expander blades 144.

The outer surface of the contact surfaces 164 includes a recess. The recess may be either a rearward recess 165 positioned toward the rear of the contact surface 164 as shown in FIG. 7, or a forward recess 166 positioned toward the front of the contact surface 164 as shown in FIG. 8. Those chuck blades 162 with a rearward recess 165 contact only the forward disk 22. Those chuck blades 162 with a forward recess 166 contact only the rearward disk 20. Those chuck blades 162 with rearward recesses 165 are alternated with chuck blades 162 with forward recesses 166 to create staggered pressure zones.

Operation of the collet assembly 10 is as follows: The disks 20, 22 are placed on the mounting chuck 16 against the sleeve 18. A securing sequence is actuated by the user, and the drawbar 12 is moved rearward. As the drawbar 12 moves, the expander 14 is moved correspondingly. As the expander 14 moves to the rear, the mounting chuck remains stationary. The motion of the outer surfaces of the angled contact surfaces 145 of the expander blades 144 against the inner surfaces of the chuck blades 162 pushes the chuck blades 162 outward. The outward movement of the chuck blades 162 causes the contact surfaces 164 of the chuck blades 162 to press against the inner diameter of the disks 20, 22. This holds the disks 20, 22 securely in place on the processing machine. The outward movement of the chuck blades 162 is limited by contact with the compression sleeve 18. Limiting the outward movement of the chuck blades 162 prohibits excessive flexion of the chuck blades 162, thereby keeping the pressure applied to the disks 20, 22 within acceptable limits.

Each of the expander blade 144/chuck blade 162 pairs forms a pressure zone. The pairs alternate as to which of the disks 20, 22 they contact. Thus there are multiple discrete contact points of the mounting chuck blades 162 against the disks 20, 22, so that variations in the inner diameter of the disks 20, 22 do not compromise the grip of the chuck 16 on the disks 20, 22. The pressure applied by the mounting chuck 16 against the disks 20, 22 can be varied by changing the angle of the expander blades 144 and the position of the compression sleeve 18.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A collet assembly adapted for use on a disk processing machine that is capable of processing two disks simultaneously, said collet assembly comprising: a drawbar in communication with an actuating device, an expander with an expander head comprising a plurality of expander blades, said expander head having a larger diameter at an outer end than at an inner end, and a mounting chuck comprising a plurality of chuck blades that contact the disk or disks to be processed; wherein when said drawbar is actuated, said drawbar pulls said expander rearward such that said head of said expander is pulled through a travel stroke in an interior of said mounting chuck within said collet assembly, said head of said expander thereby urging said chuck blades outward so that a contact area of each said chuck blade contacts an inner diameter of the disk or disks, contact of said chuck blades with said inner diameter being accomplished without longitudinal movement of said mounting chuck, and wherein each of said chuck blades comprises a discrete contact surface, a position of said contact surface varying between alternating chuck blades, so that said chuck blades with a contact surface in a first position contact a first disk without contacting a second disk, and said chuck blades with a contact surface in a second position contact said second disk without contacting said first disk.

2. The collet assembly of claim 1 wherein:
each of said expander blades corresponds in circumferential position to and forms a pair with a corresponding one of said chuck blades, such that each said expander blade controls movement of a single corresponding chuck blade.

3. The collet assembly of claim 1 wherein:
said expander head is frustum shaped.

4. The collet assembly of claim 1 wherein:
said expander comprises ten expander blades, and said mounting chuck comprises ten chuck blades.

5. The collet assembly of claim 1 wherein:
said collet assembly further comprises a compression sleeve that limits expansion of said expander and said mounting chuck.

6. The collet assembly of claim 5 wherein:
each of said expander blades corresponds in circumferential position to and forms a pair with a corresponding one of said chuck blades, such that each said expander blade controls movement of a single corresponding chuck blade.

7. The collet assembly of claim 5 wherein:
said expander head is frustum shaped.

8. The collet assembly of claim 5 wherein:
said expander comprises ten expander blades, and said mounting chuck comprises ten chuck blades.

9. A collet assembly adapted for use on a disk processing machine that is capable of processing two disks simultaneously, said collet assembly comprising: a drawbar in communication with an actuating device, an expander with an expander head comprising a plurality of expander blades, said expander head having a larger diameter at an outer end than at an inner end, a mounting chuck comprising a plurality of chuck blades that contact the disk or disks, and a compression sleeve that limits expansion of said expander and said mounting chuck; wherein when said drawbar is actuated, said drawbar pulls said expander rearward such that said head of said expander is pulled through a travel stroke in an interior of said mounting chuck within said collet assembly, said head of said expander thereby urging said chuck blades outward so that a contact area of each said chuck blade contacts an inner diameter of the disk or disks, contact of said chuck blades with said inner diameter being accomplished without longitudinal movement of said mounting chuck, and wherein each of said chuck blades comprises a discrete contact surface, a position of said contact surface varying between alternating chuck blades, so that said chuck blades with a contact surface in a first position contact a first disk without contacting a second disk, and said chuck blades with a contact surface in a second position contact said second disk without contacting said first disk.

10. The collet assembly of claim 9 wherein:
each of said expander blades corresponds in circumferential position to and forms a pair with a corresponding one of said chuck blades, such that each said expander blade controls movement of a single corresponding chuck blade.

11. The collet assembly of claim 9 wherein:
said expander head is frustum shaped.

12. The collet assembly of claim 9 wherein:
said expander comprises ten expander blades, and said mounting chuck comprises ten chuck blades.

* * * * *